United States Patent Office 3,100,504
Patented Aug. 13, 1963

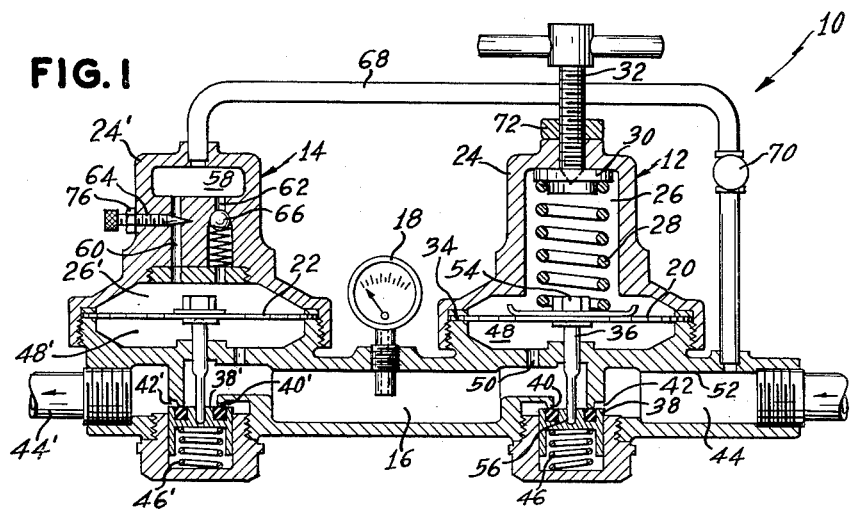

3,100,504
VALVED APPARATUS OF THE FLUID-PRESSURE RESPONSIVE TYPE
George C. Kauer, Jr., Springfield, N.J., assignor to Jelrus Technical Products Corporation, New Hyde Park, N.Y., a corporation of New York
Filed Sept. 28, 1961, Ser. No. 141,438
5 Claims. (Cl. 137—494)

This invention relates to valves and fluid pressure systems controlled by valves.

One of the objects of the present invention is to provide relief valve apparatus having a wide range, infinitely-adjustable pressure-setting range, and which closes and opens with a snap action and which has provision for reducing the pressure of a fluid pressure system to a predetermined value.

Another object is the provision of valve apparatus having the above indicated characteristics and which is therefore well adapted for use in various systems to accomplish automatically, or semi-automatically, controlled pressure-reduction in such systems.

Another object is to make provision for accomplishing the above mentioned type of pressure reduction followed, if desired, by an automatically controlled pressure restoration in the system.

Another object is the provision of a valve apparatus having two valves in fluid flow communication with each other wherein one valve is operated in response to the operation of the other valve in a manner whereby the valves operate with a snap action.

A further object is the provision of valves of the type just described for controlling the operation of an adsorption system.

Another object is to provide an adsorption system for fluid-drying treatment with valve means for automatically providing a controlled operation for the reactivation of the desiccant material employed in the system.

The above and other objects, features and advantages of the invention will be fully understood from the following description of the invention considered in connection with the accompanying drawings which are illustrative of the invention only and are not in limitation thereof.

In the drawings:

FIG. 1 is a vertical sectional view of relief valve apparatus in accordance with the present invention;

FIG. 2 is a vertical view, partly in section, of part of the valve apparatus of FIG. 1 illustrating another form thereof; and FIG. 3 is a diagrammatic illustration of an absorption system in accordance with the present invention.

Referring now to the drawings in detail and especially to FIG. 1, the adjustable relief valve apparatus 10 comprises a valve 12 in fluid flow communication with another valve 14 through a passage 16 which is provided with a pressure gauge 18 for indicating the fluid pressure in the passage. Both valves are of the diaphragm type, the movable and flexible diaphragms being indicated at 20 and 22 for valves 12 and 14, respectively.

The valve body 24 of valve 12 defines a chamber 26 at one side of diaphragm 20 in which is provided a compression spring 28. One end of spring 28 engages the diaphragm and the opposite end of the spring engages a movable disc 30 whose position in chamber 26 is controlled by a screw 32 which extends through the valve body and engages the disc. Rotation of screw 32 compresses spring 28 and increases the spring biasing force on diaphragm 20 causing the portion of the diaphragm inwardly of the gripped marginal edge 34 to move valve stem 36 against the valve disc 38 and move said disc off of the valve seat 40 to open the normally closed inlet 42 and connect inlet passage 44 to passage 16. The valve disc 38 is normally held against its seat by the compression spring 46.

The chamber 48 on the other side of diaphragm 20 is in fluid flow communication with passage 16 through a passage 50 which is provided in the wall 52 in which the valve stem 36 is mounted for sliding linear movement. It is to be understood that one end of the valve stem is secured to the diaphragm 20 by suitable means 54 and the opposite end of the valve stem is disposed in a recess 56 provided in the valve disc 38.

Valve 14 is similar in many respects to valve 12 and parts of valve 14 which are identical to parts of valve 12 are identified by the same numerals which are primed. Valve 14 has a normally closed outlet 42' due to the provision of the compression spring 46' which holds the valve disc 38' against the valve seat 40'. The outlet passage for the valve apparatus is indicated at 44'. The valve body 24' is provided with a chamber 58 and passages 60 and 62 interconnect said chamber with chamber 26' at one side of the diaphragm 22. Passage 60 is provided with a needle valve 64 for controlling the flow rate of fluid through the passage and passage 62 is provided with a check valve 66 which permits flow of fluid from chamber 58 to chamber 26' through passage 62 but prevents the flow of fluid in an opposite direction through the passage. Chamber 58 is interconnected to passage 44 by a conduit 68 and a valve 70 is provided in the conduit for a purpose which will be more fully understood hereinafter.

The operation of the relief valve apparatus 10 will now be explained in detail. The pressure which is to be relieved by the valve apparatus is set by closing valve 70 and connecting passage 44 to a source of pressure which is as high or higher than the desired set pressure of the valve apparatus. Locking nut 72 for adjusting screw 32 is loosened and the screw is turned in a drection which compresses spring 28 to apply pressure to diaphragm 20 causing the diaphragm to move and this movement is transmitted to the valve disc 38 through the valve stem 36 and causes the valve disc to move off its valve seat 40, whereby inlet 42 is opened. Fuid pressure flows through the open inlet into passage 16 and into chambers 48 and 48' of valves 12 and 14, respectively, which causes diaphragm 20 to move in an opposite direction and inlet 42 closes. Continuous rotation of screw 32 opens the inlet and raises the pressure in chambers 48 and 48' and passage 16, as indicated by the pressure gauge 18 and when said gauge indicates the desired set pressure, screw 32 is locked in place by locking nut 72 and the valve apparatus is now set to relieve pressure at the value indicated on the pressure gauge, it being understood that inlet 42 is closed.

The pressure in chambers 48 and 48' and passage 16 will remain at the value indicated on the gauge 18 because there is no outlet for the pressure fluid since both the inlet 42 and the outlet 42' are closed because of the compression springs 46 and 46' which hold the valve discs against their respective seats. In the event that this pressure bleeds off for some reason, it will be automatically reestablished when the apparatus is connected to a pressure vessel or system as will be understood hereinafter.

In lieu of providing spring 28 and screw 32 for setting the valve for relieving pressure of a predetermined value, the set pressure of the valve may be established remotely by providing a fluid connection 74, as indicated in FIG. 2. Through the use of a pressure regulator, the pressure of the fluid introduced through connection 74 into chamber 26 can be varied to provide a corresponding force on diaphragm 20 as was provided by the screw 32 and spring 28.

After the relief pressure of the valve apparatus 10 is set, passage 44 is connected to the pressure system or vessel which is to be protected against excess pressure and valve 70 is opened. Fluid pressure from the system now flows through passage 44, conduit 68 into chamber 58 of valve 14, and through passages 60 and 62 into chamber 26' where it acts on the adjacent side of diaphragm 22 tending to move said diaphragm in a direction to open outlet 42'. The previously set pressure acts on the opposite side of diaphragm 22 so that as long as the set pressure is higher or equal to the system or vessel pressure in chamber 26', the inlet 42 and outlet 42' will remain closed because of the biasing forces of springs 46 and 46'. When the system pressure becomes greater than the set pressure in an amount which is greater than the biasing force of spring 46', valve disc 38' moves off of its valve seat to open outlet 42' which allows pressure fluid in chambers 48 and 48' and passage 16 to flow through outlet 42' into passage 44'. The resulting reduction in pressure in chamber 48' causes diaphragm 22 to quickly move in a direction which moves valve disc 38', with a snap action, from its seat and outlet 42' fully opens resulting in a rapid loss of pressure in chambers 48 and 48' and passage 16.

Concurrently with the opening of outlet 42', inlet 42 also opens due to the reduction of pressure in chamber 48 and valve disc 38 moves off its seat because of the spring or fluid pressure on diaphragm 20 and the opening of the inlet also occurs with a snap action. The pressure of the connected system or vessel is reduced rapidly at the full capacity of the valves 12 and 14 because of the substantially instantaneous opening of the inlet and outlet to a fully open position.

As the pressure in passage 44 is reduced, the fluid in chamber 26', which is at a higher pressure, tends to flow back to passage 44 through conduit 68 in an effort to equalize the pressures between the chamber and the passage and it will be apparent that as soon as the pressure in chamber 26' is equal to the reduced pressure of the system or vessel, outlet 42' will close and prevent any further reduction of pressure in the system. By restricting the rate of flow of the pressure fluid from chamber 26' to passage 44, the closing of outlet 42' is delayed and the pressure of the system or vessel can be reduced to any value depending upon the period of delay. The rate of flow of pressure from chamber 26' to passage 44 can be restricted and varied by the adjustable needle valve 64. A lock nut 76 is provided to lock valve 64 in adjusted position at any desired flow rate.

The closing of outlet 42' also occurs with a snap action because as valve disc 38' initially moves toward its seat, the restriction of the outlet 42' results in an increase in pressure in chamber 48' which increases the movement of the diaphragm 22 in a direction which closes the outlet. Inlet 42 remains open because of the pressure of the spring or air on the diaphragm 22 which is greater than the pressure in chamber 48 and the force of spring 46. During operation of the vessel or system, after its pressure has been relieved and reduced, the increasing pressure of the fluid in the system flows through the open inlet 42 and increases the pressure in chambers 48 and 48' and passage 16 and when the pressure in chamber 48 reaches a value which is equal to the previously set pressure at which the system is to be relieved, then inlet 42 closes and the valve apparatus 10 is in the exact condition which it was in when the relief pressure of the apparatus was initially set, as described above. With the inlet and outlet closed, the valve apparatus will again relieve pressure in the manner just described.

FIG. 3 illustrates the embodiment of semi-automatically controlled valve apparatus of the indicated type in a system for semi-automatic control of the reactivation of a desiccant material employed in the system. More particularly, FIG. 3 illustrates an adsorption system wherein a desiccant is provided for removing moisture from air which is delivered under pressure to a dental hand piece, for example a dentist's drill for operating the drill. The adsorption system comprises, in addition to the desiccant chamber 80, normally closed valves 82 and 84 which are connected to each other by a conduit 86, a moisture indicator 88 of a well known type, a muffler 90 connected to the outlet 92 of the valve 82 by a conduit 94, and the various parts of the system are interconnected by the conduits 96, 98, 100, 102, 104, 106 and 108, as illustrated. The inlet for valve 84 is idicated at 110 and it will be understood that the valves 82 and 84 are of the same construction as valve 12 shown in FIG. 2 and the valves are interconnected with each other in the manner shown.

The operation of the valves and the system will now be described in detail. During normal operation of the system, manually operated valve 112 is closed, as shown, and pressure fluid is transmitted from a suitable source, such as a compressor (not shown), and is introduced into conduit 102 which is provided with a constriction or orifice 114 which restricts the flow of air into the system to enable the reverse flow of dry air from the system to reactivate the desiccant as hereafter described. Since the inlet 110 of valve 84 is closed and valve 112 is also closed, no fluid is transmitted to valve 82 during normal operation of the system and the valves remain closed. The fluid flows into chamber 26 of valve 84 and increases the pressure therein but the valve does not open because of the biasing force of spring 46 and the pressure in chamber 48 which exert a force on the valve disc 38 which holds the disc on its seat. The pressure fluid flows through the desiccant chamber 80 and the moisture indicator 88 and through the fitting 118 and conduit 120 to the system and delivers dry fluid to said system.

After a period of operation, the desiccant material of the chamber 80 has adsorbed a considerable amount of moisture and it is necessary to reactivate the desiccant material by drying it and this may be accomplished by using the dry fluid which has previously been transmitted to the system which may be provided with a storage tank of the dry air, if necessary, or the lengths of the fluid lines of the system may have enough storage capacity for providing the necessary volume of dry pressure fluid.

To reactivate the desiccant material, valve 112 is opened. Dry air from the system or storage tank then flows through conduits 120 and 108, respectively, into chamber 26' of valve 82 causing outlet 92 to open in the exact same manner as previously described with respect to valve 14. The resulting reduction in pressure in chamber 48 of valve 84, due to the interconnecting conduit 86, causes inlet 110 to open because of the excess pressure in chamber 26. Dry air then flows through conduit 106, indicator 88, conduit 104, through orifice or restriction 105 which results in the expansion of the air through said orifice for the flow of a maximum volume of dry air through the desiccant chamber 80 and from the chamber the fluid containing the adsorbed moisture flows through valves 84 and 82, respectively, and through the outlet 92 and muffler 90 which reduces the noise of the escaping air since it will be understood that the valves open fully with a snap action, as previously described, and there is a rapid flow of fluid through the desiccant chamber from the system.

The pressure fluid in chamber 26' will tend to flow through conduit 108 toward fitting 118 as the pressure in conduit 120 is reduced and the equalization of the pressure between these two points is delayed by the provision of a constricted portion 122 in conduit 108 which delays the flow of fluid from chamber 26' to fitting 118 in the exact same manner as previously described with respect to the needle valve 64 provided in valve 14. By varying the size of the opening of constriction 122, the period of reactivation of the desiccant material can be varied as necessary or as desired and it will be understood that when the pressure in chamber 26' is reduced and is equal to the reduced pressure of the system, then outlet 92 closes with a snap action due to spring 46' and inlet 110 also closes due to the force of spring 46 and the increase in pressure in chamber 48 upon the closing of the outlet 92. Air will then flow into the system from the compressor, while valve 112 is still open, and reactivation is repeated cyclically one or more times in the manner previously described during a period of time required for a more or less complete reactivation of the desiccant. Upon closing valve 112, the system is again in condition for normal operation.

The valve apparatus of the present invention may be used in various systems for automatically, or semi-automatically, controlled pressure-reduction with automatic or semi-automatic restoration of the pressure in the system. Among such uses are, without limitation, vessels or systems which must be protected from over pressure, sampling systems which require repeated depressuring and repressuring, systems in which control of chemical reactions that generate pressure is desired, automatic blowing down of filters for cleaning purposes, automatic cycling of multivessel systems, for example, reactors and dehydrators, providing automatic repetition of timed cycles of operations in pressure systems and automatic sequencing of operations in such systems, and other similar uses.

It will be understood that it is within the scope of the invention to provide the needle valve 64 in conduit 108 in lieu of the constricted portion 122 and it will be also understood that the constricted portion may be provided in valve 14 in lieu of the needle valve 64.

While I have shown and described the preferred embodiment of the invention, it will be understood that the invention may be embodied otherwise than as herein specifically illustrated or described, and that certain changes in the form and arrangements of parts and in the specific manner of practicing the invention may be made without departing from the underlying idea or principles of this invention within the scope of the appended claims.

What is claimed is:

1. Valved apparatus of the fluid-pressure responsive type, comprising:
   (a) a valve having an inlet and pressure responsive means for controlling the opening and closing of said inlet,
   (b) another valve having an outlet and pressure responsive means for controlling the opening and closing of said outlet,
   (c) means interconnecting said pressure responsive means of said valves in fluid flow communication with each other so that operation of said pressure responsive means of said other valve for opening said outlet results in a reduction of pressure on said pressure responsive means of said first mentioned valve and the opening of said inlet,
   (d) means interconnecting said pressure responsive means of said other valve with said inlet in fluid flow communication with each other for equalizing the pressure therebetween to close said outlet, and
   (e) means for delaying the equalization of said pressure to delay the closing of said outlet.

2. Valved apparatus, of the fluid-pressure responsive type, comprising:
   (a) a plurality of pressure responsive valves each having an inlet and an outlet, a fluid passage therethrough, and a movable closure in the passage between its inlet and its outlet biased to a closed position and movable to an open position,
   (b) each of said valves having a chamber and a diaphragm which divides the chamber into two separate compartments and which is operatively connected to the aforesaid closure member of the valve for at least partly controlling the operation of the closure member,
   (c) means for applying a predetermined pressure to one side of the diaphragm of one of said valves in closure-opening direction,
   (d) a fluid passage connecting the outlet of one of said valves to the inlet of another of said valves,
   (e) said connecting fluid passage being in communication with the compartment of said one valve at the side of said diaphragm opposite said one side thereof whereby the fluid pressure in said connecting passage is applied to said diaphragm in closure-closing direction,
   (f) said connecting fluid passage being in communication with one compartment of said other valve for the application of fluid pressure to one side of the diaphragm therein in closure-closing direction, and
   (g) means for conducting fluid to the other compartment of said other valve for applying fluid pressure to the opposite side of said diaphragm of said other valve for opening the closure of said other valve when the fluid pressure at said other side of its diaphragm is sufficiently high to overcome the valve-closing pressure on said other valve, whereby to reduce the pressure in the compartment of said one valve at said opposite side of the diaphragm to a value below the closing pressure on said one valve so that it opens and permits the flow of fluid from the inlet of its passage to the outlet thereof.

3. Valved apparatus, of the fluid-pressure responsive type, comprising:
   (a) a plurality of pressure responsive valves each having an inlet and an outlet, a fluid passage therethrough, and a movable closure in the passage between its inlet and its outlet biased to a closed position and movable to an open position,
   (b) each of said valves having a chamber and a diaphragm which divides the chamber into two separate compartments and which is operatively connected to the aforesaid closure member of the valve for at least partly controlling the operation of the closure member,
   (c) spring means for applying a predetermined pressure to one side of the diaphragm of one of said valves in closure-opening direction,
   (d) a fluid passage connecting the outlet of one of said valve to the inlet of another of said valves,
   (e) said connecting fluid passage being in communication with the compartment of said one valve at the side of said diaphragm opposite said one side thereof whereby the fluid pressure in said connecting passage is applied to said diaphragm in closure-closing direction,
   (f) said connecting fluid passage being in communication with one compartment of said other valve for the application of fluid pressure to one side of the diaphragm therein in closure-closing direction, and
   (g) means for conducting fluid to the other compartment of said other valve for applying fluid pressure to the opposite side of said diaphragm of said other valve for opening the closure of said other valve when the fluid pressure at said other side of its diaphragm is sufficiently high to overcome the valve-closing pressure on said other valve, whereby to reduce the pressure in the compartment of said one valve at said opposite side of the diaphragm to a value below the closing pressure on said one valve so that it opens and permits the flow of fluid from the inlet of its passage to the outlet thereof.

4. Valved apparatus, of the fluid-pressure responsive type, comprising:
   (a) a plurality of pressure responsive valves each having an inlet and an outlet, a fluid passage therethrough, and a movable closure in the passage between its inlet and its outlet biased to a closed position and movable to an open position, (b) each of said valves having a chamber and a diaphragm which divides the chamber into two separate compartments and which is operatively connected to the aforesaid closure member of the valve for at least partly controlling the operation of the closure member, (c) regulated fluid-pressure means for applying a predetermined pressure to one side of the diaphragm of one of said valves in closure-opening direction, (d) a fluid passage connecting the outlet of one of said valves to the inlet of another of said valves, (e) said connecting fluid passage being in communication with the compartment of said one valve at the side of said diaphragm opposite said one side thereof whereby the fluid pressure in said connecting passage is applied to said diaphragm in closure-closing direction, (f) said connecting fluid passage being in communication with one compartment of said other valve for the application of fluid pressure to one side of the diaphragm therein in closure-closing direction, and (g) means for conducting fluid to the other compartment of said other valve for applying fluid pressure to the opposite side of said diaphragm of said other valve for opening the closure of said other valve when the fluid pressure at said other side of its diaphragm is sufficiently high to overcome the valve-closing pressure on said other valve, whereby to reduce the pressure in the compartment of said one valve at said opposite side of the diaphragm to a value below the closing pressure on said one valve so that it opens and permits the flow of fluid from the inlet of its passage to the outlet thereof.

5. Valved apparatus, of the fluid-pressure responsive type, comprising:

(a) a plurality of pressure responsive valves each having an inlet and an outlet, a fluid passage therethrough, and a movable closure in the passage between its inlet and its outlet biased to a closed position and movable to an open position, (b) each of said valves having a chamber and a diaphragm which divides the chamber into two separate compartments and which is operatively connected to the aforesaid closure member of the valve for at least partly controlling the operation of the closure member, (c) means for applying a predetermined pressure to one side of the diaphragm of one of said valves in closure-opening direction, (d) a fluid passage connecting the outlet of one of said valves to the inlet of another of said valves, (e) said connecting fluid passage being in communication with the compartment of said one valve at the side of said diaphragm opposite said one side thereof whereby the fluid pressure in said connecting passage is applied to said diaphragm in closure-closing direction, (f) said connecting fluid passage being in communication with one compartment of said other valve for the application of fluid pressure to one side of the diaphragm therein in closure-closing direction, and (g) means in fluid-flow communication between the other compartment of said other valve and the inlet side of said one valve for conducting fluid to the other compartment of said other valve for applying fluid pressure to the opposite side of said diaphragm of said other valve for opening the closure of said other valve when the fluid pressure at said other side of its diaphragm is sufficiently high to overcome the valve-closing pressure on said other valve, whereby to reduce the pressure in the compartment of said one valve at said opposite side of the diaphragm to a valve below the closing pressure on said one valve so that it opens and permits the flow of fluid from the inlet of its passage to the outlet thereof.

References Cited in the file of this patent
UNITED STATES PATENTS

| | | |
|---|---|---|
| 2,494,644 | Clement | Jan. 17, 1950 |
| 2,773,313 | O'Connor | Dec. 11, 1956 |
| 3,043,333 | Kugler | July 10, 1962 |

FOREIGN PATENTS

| | | |
|---|---|---|
| 1,078,864 | France | May 12, 1954 |